WEST & KELLOGG.
Hand Seeder.
No. 40,299. Patented Oct. 13, 1863.
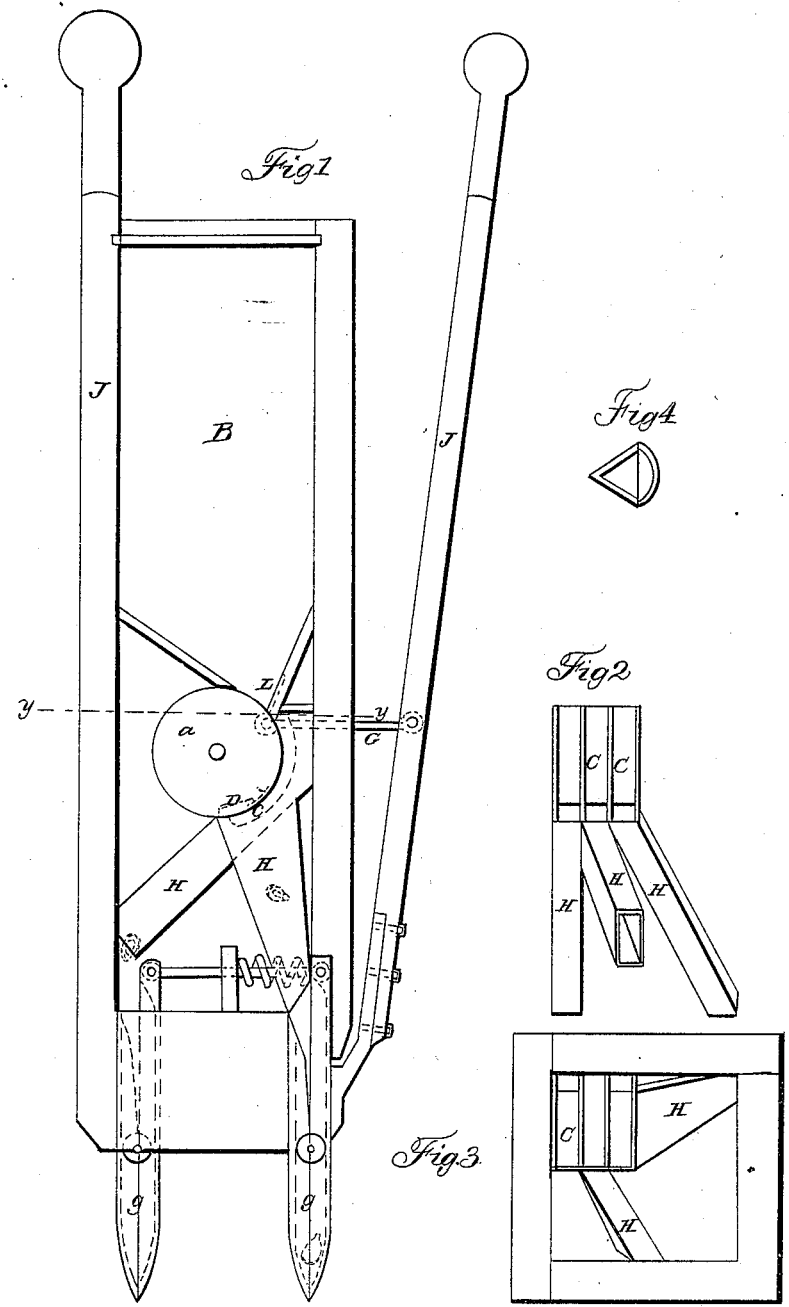

UNITED STATES PATENT OFFICE.

H. B. WEST AND C. A. KELLOGG, OF ELYRIA, OHIO.

IMPROVEMENT IN HAND CORN-PLANTERS.

Specification forming part of Letters Patent No. 40,299, dated October 13, 1863.

*To all whom it may concern:*

Be it known that we, H. B. WEST and C. A. KELLOGG, of Elyria, Lorain county, Ohio, have invented a new and Improved Hand Seed-Planter; and we declare the following to be a full description thereof, reference being made to the accompanying drawings, in which—

Figure 1 is a side elevation with side board removed. Fig. 2 is a detached view of the separator or tubes. Fig. 3 is a horizontal section taken at section, line $y$, Fig. 1. Fig. 4 is a horizontal section of an inserter or bill.

A in Fig. 1 represents a semi-revolving cylinder, which moves the seed from hopper B to separator C. This seed-cylinder is provided with a recess, D, which, with the assistance of flexible gate E, measures the amount of seed to be used at each hill. This recess is furnished with an adjustable gage, so arranged by two screws moving in slots that the amount of seed may either be increased or decreased. Seed-cylinder A is revolved by the action of lever F and connecting-rod G. As the seed is emptied from recess D it falls into separator C, which is provided with tin partitions arranged in such a manner as to divide it, sending a portion of the seed into each of the three conductors H H H to the inserters I I I, where it is retained in the hollow at the lower end of the inserters until they are opened.

The operation of the planter is as follows: The machine is carried in the right hand by handle J and is thrust into the earth the full length of the inserters I I I. Then handle F is brought toward hopper B by the left hand, which, by the connection of handle F with the moving parts of the inserters, opens them and allows the seed to drop out. The planter is now removed from the earth and is closed by the action of spring K, which closing movement carries cylinder A around, so that the seed is deposited in the separator, and thence, as before stated, into the earth. We should have said when the inserters were opened by the movement of handle F that cylinder A was moved over, so that recess D was at the bottom of hopper B, where it fills with seed.

Spring K may be located on the outside and between the side of the hopper and handle F.

Fig. 2 shows our separator, which we consider a very desirable arrangement, from the fact that it is positive, always dividing the seed. The seed as it falls into it, is divided by the partitions, as shown, under C C, a portion being deposited in each conductor.

Fig. 3 is a horizontal section taken at $y$, Fig. 1, and shows the separator with its portions and an imperfect view of the conductors H H H. Fig. 4 is a section of an inserter which may be used, being provided with a cutting-edge on the moving half, operating easier in hard soil.

We do not consider all our individual parts new, as planters operated by levers and inserters have before been used; but the arrangement and combination which we show you we think is novel, and is thoroughly practical and useful.

What we claim and desire to secure by Letters is none of the individual parts, but

The combination of the seeding-cylinder A, having the cell D in but one instead of several divisions, lever F, and rod $g$, with the seed dividing and distributing device C H, when the whole are constructed and arranged to operate in the manner and for the purpose herein set forth.

H. B. WEST.
C. A. KELLOGG.

Witnesses:
S. E. C. WEST,
Y. H. CASE.